United States Patent [19]

Gates

[11] Patent Number: 5,054,311
[45] Date of Patent: Oct. 8, 1991

[54] FULLY AUTOMATED LEAK TESTING APPARATUS

[75] Inventor: Donald C. Gates, Troy, Mich.
[73] Assignee: Expertek, Inc., Detroit, Mich.
[21] Appl. No.: 449,701
[22] Filed: Dec. 11, 1989
[51] Int. Cl.$^5$ ............................................. G01M 3/04
[52] U.S. Cl. ..................................................... 73/41.4
[58] Field of Search ...................... 73/41.2, 41.3, 41.4, 73/45.5, 45.8, 45, 45.1, 45.3, 45.4

[56] References Cited

U.S. PATENT DOCUMENTS

| | | | |
|---|---|---|---|
| 778,622 | 12/1904 | Ayars | 73/41.2 |
| 2,408,202 | 9/1946 | Dickman | 73/45 |
| 3,590,256 | 6/1971 | Neeff | 73/52 X |
| 4,328,441 | 5/1982 | Kroeger, Jr. et al. | 310/319 |
| 4,616,503 | 10/1986 | Plungis et al. | 73/55 |
| 4,633,123 | 12/1986 | Radice | 310/339 |
| 4,638,207 | 1/1987 | Radice | 310/328 |
| 4,869,096 | 9/1989 | Rickard et al. | 73/41.2 |
| 4,903,524 | 2/1990 | Kataoka et al. | 73/45.5 |

FOREIGN PATENT DOCUMENTS

| | | |
|---|---|---|
| 1471239 | of 1967 | France . |
| 16178 | 7/1977 | Japan . |
| 127140 | 7/1983 | Japan . |
| 145430 | 7/1986 | Japan . |
| 143929 | 6/1989 | Japan . |
| 145541 | 6/1989 | Japan . |
| 977967 | 11/1982 | U.S.S.R. . |

Primary Examiner—Jerry W. Myracle
Attorney, Agent, or Firm—Dinnin & Dunn

[57] ABSTRACT

A fully automated leak testing apparatus is disclosed in which the components to be tested are loaded on a water wheel for indexed movement through a water tank in which when the chamber is positioned at a test station within the liquid, bubbles of a leaking gas rising from the chamber are deflected by a panel to one of a plurality of predetermined locations at which is positioned a bubble detector device comprising a fiber optic cable for transmitting light to and across the predetermined location where it is received by another fiber optic cable and transmitted to a bubble detector. When a bubble passes the predetermined locations, the light transmitted across the location is interrupted producing a signal from the bubble detector of the bubble passing the predetermined location. When a predetermined number of bubbles are detected, a leak is indicated and that chamber is rejected. The water wheel then rotates the chamber to an unload position where the tested chamber is removed from the water wheel. With the use of automatic loading and unloading equipment, the entire leak testing process can be automated.

21 Claims, 3 Drawing Sheets

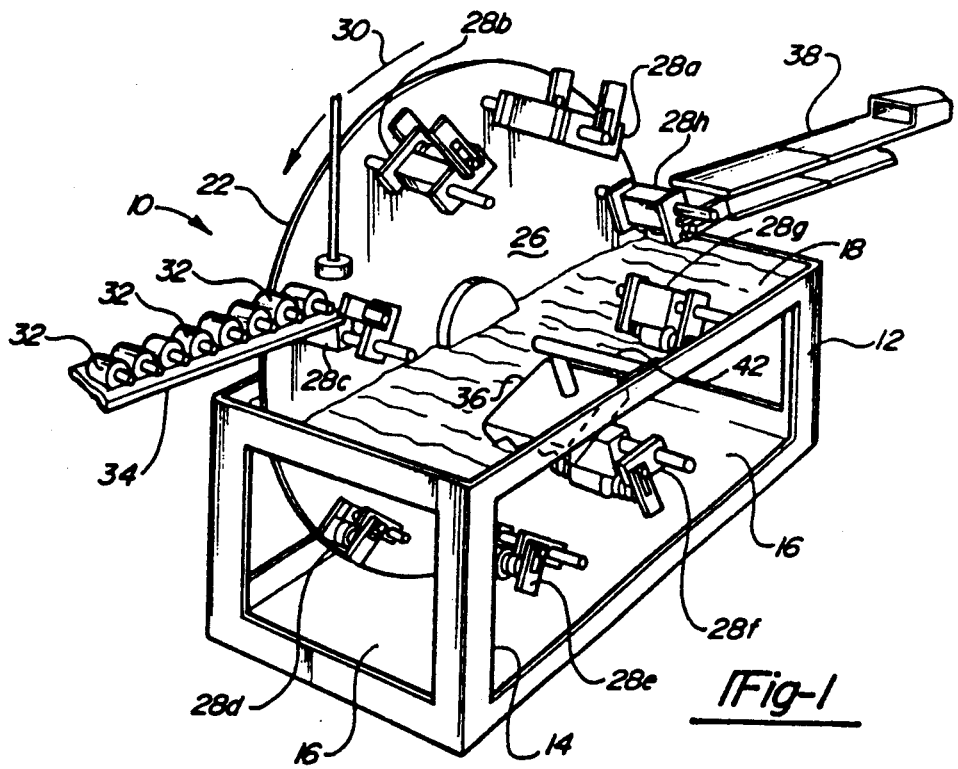
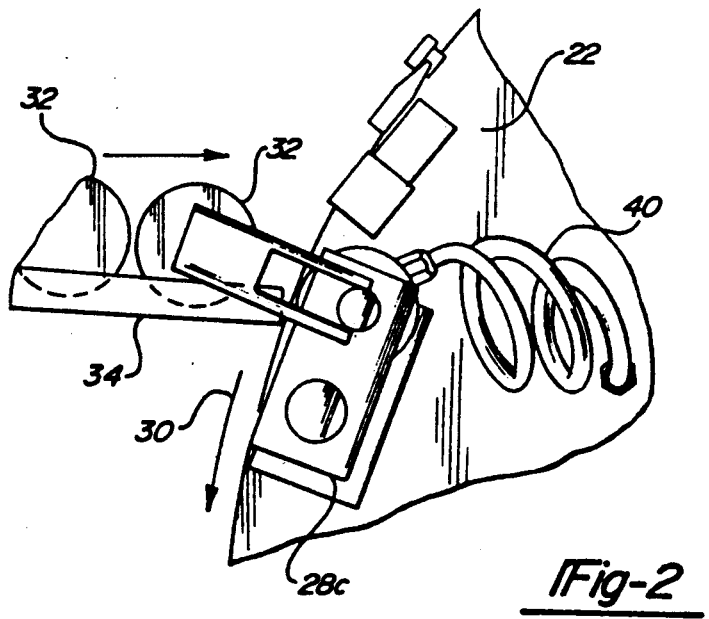

FULLY AUTOMATED LEAK TESTING APPARATUS

BACKGROUND AND SUMMARY OF THE INVENTION

This invention relates to a leak detection apparatus and more particularly to an automated means for detecting leaks via liquid immersion testing.

Numerous components are manufactured which must meet a standard for a "leak tightness". Leak tightness is a relative term, as nothing can ever be completely free of leakage. A balance must be made between the increasing cost of finding smaller and smaller leaks and their importance to the functioning of the unit over its useful life. leak tightness is the practical leakage that is acceptable under normal operating circumstances.

Components which require some degree of leak tightness, for example, include fuel tanks, radiators, fuel filters, water pumps, refrigeration components, heater cores, torque convertors, hydraulic and pneumatic components etc. The acceptable leakage will depend upon the usage of the component with respect to the type of fluid which must be contained, i.e. a gas or a liquid, and whether or not the contents will be pressurized.

Several leak detection methods are commonly used in industry. Each method has its own advantages, limitations and sensitivity range. As a result, not all methods are useful for every application. The correct choice of the leak detection method should optimize cost, sensitivity and reliability of the test.

Liquid immersion testing is one of the oldest documented methods used to detect leaks. Liquid immersion testing operates on the basis of a differential pressure at the leak creating a flow of a gas from within the component to the liquid outside. The part being tested is pressurized with a gas and then immersed in a liquid medium, generally water. The gas escaping the pressurized component produces one or more bubbles in the liquid which then rise to the surface of the water. The component being tested is allowed to remain in the liquid for a period of time while the liquid test medium is examined for the presence of bubbles. The location of bubbles indicates the location of a leak and the frequency and size of the bubbles can be used to estimate the leakage rate.

Liquid immersion testing has several advantages which include, low equipment cost relative to other methods, location of the leak can be determined, the equipment can easily be made durable enough for factory floor applications, and various size and shape components can be tested utilizing one test apparatus.

The primary disadvantage with liquid immersion testing is the requirement of an operator to visually inspect the water for bubbles of leaking gas. This adds subjectivity to the test and, in addition, research has shown that an operator's ability to accurately identify leaks decreases during the course of a typical eight hour work shift.

Accordingly, it is an object of this invention to provide a liquid immersion leak testing apparatus which includes an automatic means for detecting the presence of bubbles of gas leaking from the component being tested.

It is a further object of this invention to fully automate the leak detection process by automatically loading parts to be tested into the leak detector, move the parts to a test station, remove the parts from the leak detector and separate defective parts from non-defective parts.

It is an advantage of this invention that a low cost liquid immersion leak testing apparatus is provided which is fully automated to eliminate operator dependence.

It is an advantage of this invention that a low cost liquid immersion testing apparatus can be equipped with an automatic sensing means which provides increased accuracy in detecting leaks without significantly increasing the cost of the device.

SUMMARY OF THE INVENTION

The leak detection apparatus of this invention employs a tank for submerging the component to be tested in a liquid test medium, typically water. Other liquids may be used as long as they are compatible with the test apparatus and the component being tested. Automatic identification of bubbles is accomplished by using fiber optics. To provide complete coverage of the surface area above the component being tested, a plastic channeling device is used to direct the bubbles rising in the liquid along a predetermined path which passes between a light transmitter and a light receiver. As the bubbles cross the path of light, the light to the receiver is interrupted. The number of interruptions is counted, and when a predetermined number is reached, a leaking component is indicated.

It is contemplated that the channeling device be in the form of a panel constructed of a plastic material such as acrylic that on its lower side has a plurality of ridges and grooves extending across the acrylic panel. The panel is positioned in the liquid above the component being tested and is inclined in the direction of the grooves such that bubbles rising from the component will impact the acrylic panel, move upward to one of the grooves in the underside of the panel and travel through the apex of the groove toward the upwardly inclined end of the acrylic panel. A significant advantage of the described panel over funneling devices used in prior automated detectors is that the required depth of water over the test part is greatly reduced. This is a major consideration for relatively large parts.

Near the upper end of the panel, there is an aperture which extends vertically from each groove apex through the panel to the upper surface of the panel. Bubbles traveling through the grooves will rise through one of these apertures. A fiber optic transmitter and receiver are positioned on the panel top surface on opposite sides of each aperture so that rising bubbles pass through the light.

The number of fiber optic detectors and grooves in the panel can range from two or three to as many as fifteen to provide coverage to the entire component being tested. By increasing the number, the corresponding area of the component being tested by each detector may be reduced, thereby increasing the accuracy of leak localization.

An electrical circuit, which may or may not include a computer, can be used to count the number of bubbles detected and a fault signal can be activated when the number of bubbles counted exceeds a predetermined number, thereby indicating a leaking component.

The system can detect gross leaks to very small leaks having a leakage rate of $10^{-4}$ cc/sec. The test time must be increased as leak sensitivity is increased to allow a bubble to be formed on the component surface that is large enough to overcome the surface tension holding the bubble to the component surface. Surface tension can be reduced significantly by addition of a suitable wetting agent in the water such as GAF Chemical Corp. CO-630. The rate of bubble emission will then be greatly increased.

The leak detector is fully automated by a rotating water wheel to carry the component being tested through the water to a test station beneath the bubble channelling device. The wheel is upright and rotated about a generally horizontal axis. The wheel contains a plurality of component mounting fixtures positioned around the periphery of the wheel at circumferentially equally spaced positions.

The rotation of the wheel is indexed such that the wheel stops after a rotation equal to the angular spacing between each of the component mounting fixtures. In the stopped position, one mounting fixture is disposed in a water tank beneath the bubble deflection panel and serves as a test station. The component in the test station is tested for leaks with any bubbles rising from the component striking the channelling device and being deflected past one of the fiber optic detectors. Another mounting fixture on the wheel is in a position to have a tested component unloaded while yet another mounting fixture is in position to have a component mounted thereon for testing. As the wheel is rotated, the mounting fixture from the test station is moved to the unload station and subsequently to the loading station for receiving a new component to be tested.

Each mounting fixture includes means for sealing the component to be tested and also for pressurizing the component with a gas, typically air.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the automated leak testing apparatus of the present invention;

FIG. 2 is a fragmentary elevational view of the water wheel showing a component mounting fixture in the load station receiving a component to be tested;

DETAILED DESCRIPTION OF THE DRAWINGS

Figure 3:
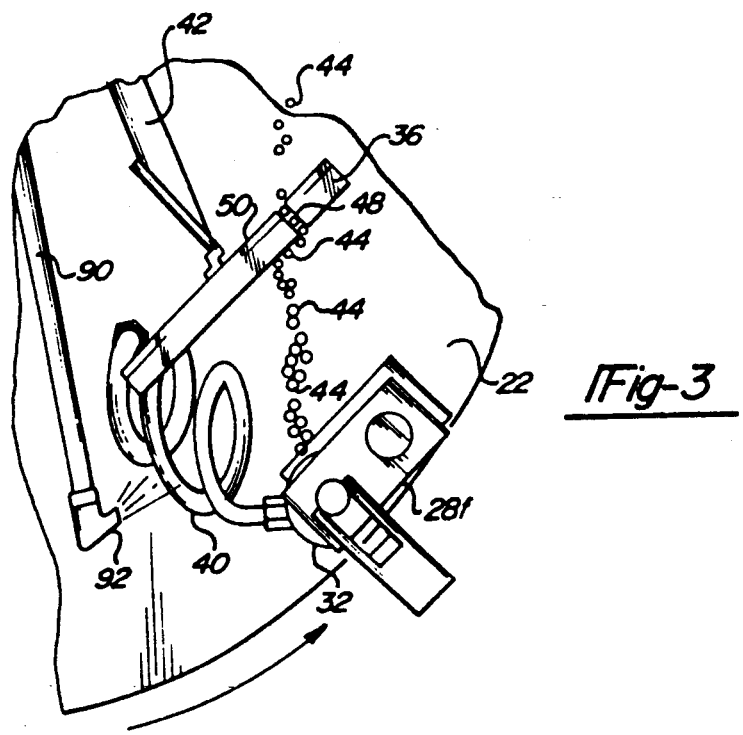
FIG. 3 is a fragmentary elevational view of the water wheel showing a component mounting fixture in the test station, the bubble deflecting panel and gas leak bubbles rising from the component.

The leak detection apparatus of the present invention is shown in FIG. 1 and designated generally at 10. The apparatus 10 employs a liquid holding tank 12 which is constructed of an metal framework 14 and transparent acrylic inserts 16 to permit viewing of leak location and test fixture seal effectiveness. Tank 12 is filled with a liquid 18 such as water.

Figure 5:
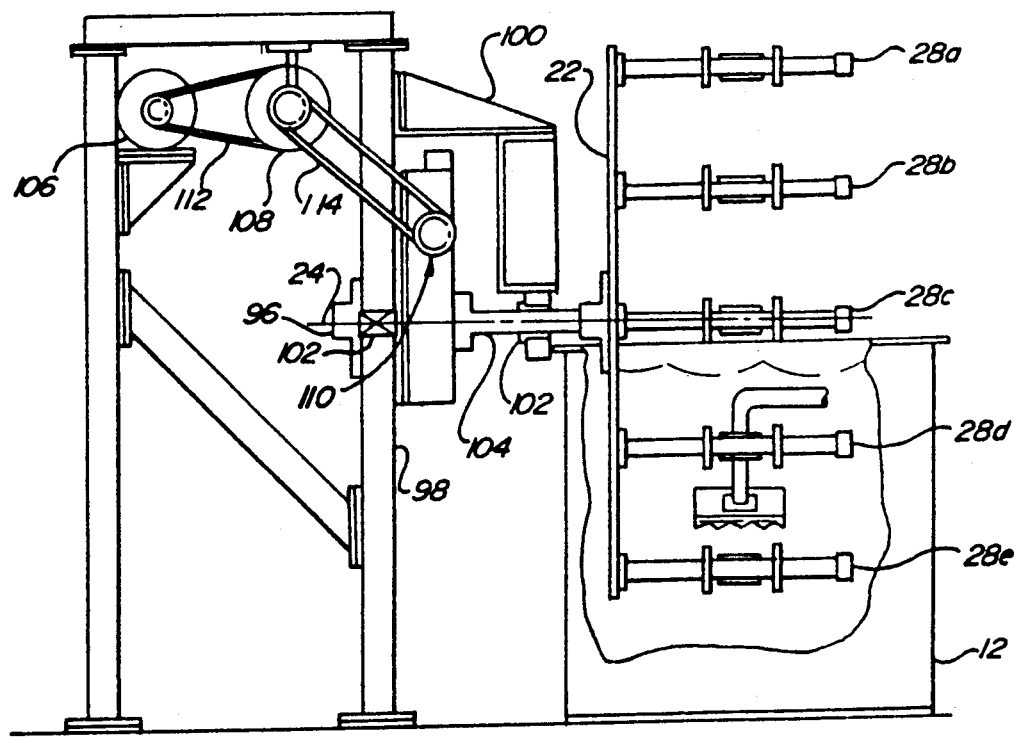
FIG. 5 is a side elevational view of the automated leak test apparatus showing the water wheel rotational drive.

An upright wheel 22 is rotatable about a generally horizontal axis 24, shown in FIG. 5. The wheel is positioned such that a lower portion of the wheel comprising somewhat less that one half of the wheel is submerged in the water 18 within tank 12. Attached to the front face 26 of wheel 22 are a plurality of component mounting fixtures 28a–h. The mounting fixtures 28 are mounted to the wheel adjacent the periphery the wheel and are circumferentially, equally spaced about the wheel 22. The mounting fixtures 28 are used to mount a component part to be tested to the rotating wheel 22. Each fixture includes a means for retaining the component to the fixture. The mounting fixtures may also include means for pressurizing the interior of the component with a gas, typically air. In the embodiment shown, the apparatus 10 is equipped to leak test fuel filter housings.

The wheel 22 is moved in a counterclockwise direction as indicated by the arrow 30. The rotation of the wheel is indexed such that the wheel will sequentially move a component to various stations circumferentially spaced about the wheel. The mounting fixture 28c is at the loading station where the last fuel filter housing 32 on a ramp 34 is allowed to roll down into the mounting fixture 28. Once on the mounting fixture, the mounting fixture will seal the two open ends of the fuel filter and pressurize the interior thereof.

The mounting fixture 28f is in a position submerged in the water beneath the bubble deflecting panel 36 which is used to deflect any bubbles of gas leaking from the fuel filter housing past one of a plurality of bubble detectors as will be described in greater detail below.

The mounting fixture 28h is at the unload station in which a tested fuel filter housing is unloaded from the fixture and deposited on a second inclined ramp 38.

Each mounting fixture 28 includes a component retaining means which may be electronically or pnuematically controlled. When testing a sealed component, for example a pressurized fire extinguisher, a retaining means for the component is all that is needed for the fixture. When testing a component which is open, such as a fuel filter housing having inlet and outlet openings, the openings must also be sealed and the interior of the housing pressurized. Air hose 40 is used to pressurize the component and can also be used to activate a pneumatic cylinder carrying the seal. The electrical and pneumatic supplies are provided to each fixture 28 through a rotating union 96 on the back of drive indexer 110.

FIG. 2 shows an enlarged view of the mounting fixture 28c in the load position. An automatic stop mechanism (not shown) is attached to the ramp 34 for retaining the fuel filter housings 32 on the ramp. When the wheel has rotated to the position shown, the stop mechanism automatically releases one fuel filter housing to roll downward into the mounting fixture. The air hose 40 is used to provide pressurized gas to the mounting fixture to pressurize the interior of the fuel filter.

With reference to FIG. 3, the mounting fixture 28f is shown at the test position vertically below the deflecting panel 36. A number of gas leak bubbles 44 are rising from the fuel filter 32 to the deflecting panel 36 and are traveling along the bottom of the panel to an aperture 48 in the panel near its upper end. Fiber optic cables (shown in FIG. 6) are attached to the upper surface 50 of the panel 36 adjacent the aperture 48. One cable transmits light across the top of the aperture 48 where it is received in another fiber optic cable. This light is interrupted by the bubbles 44 passing through the aperture. The panel 36 and the fiber optic cables are shown in greater detail in FIG. 6.

Figure 4:
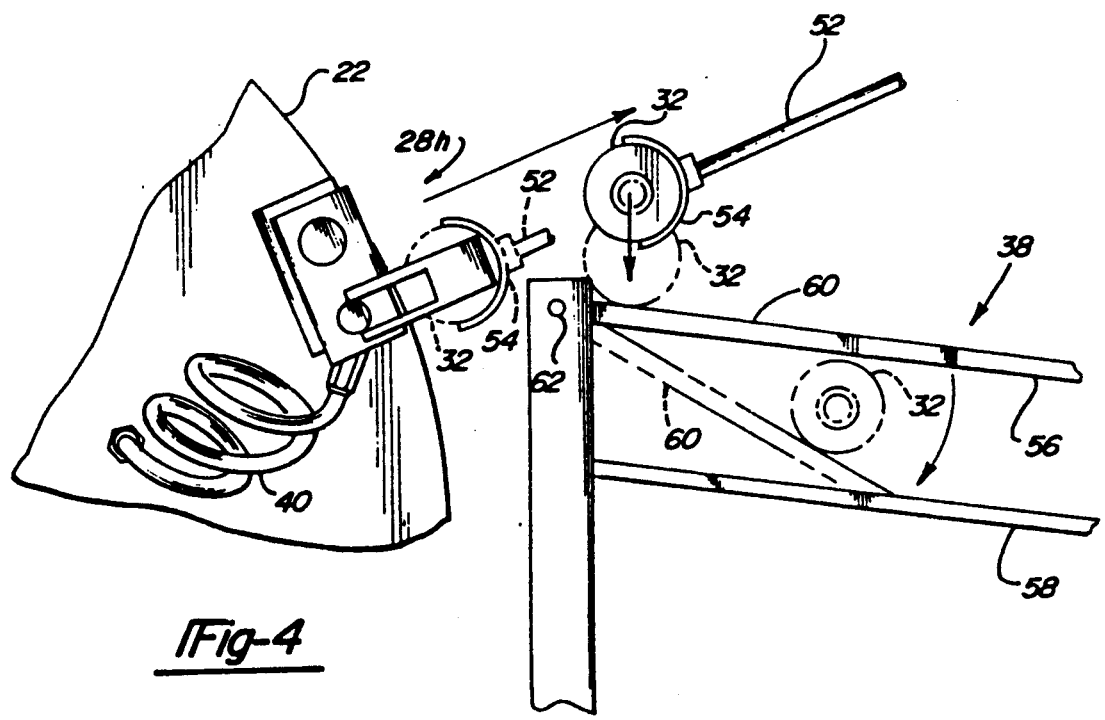
FIG. 4 is a fragmentary elevational view of the water wheel showing a component mounting fixture at the unload station and the component being unloaded therefrom.

FIG. 4 illustrates the mounting fixture 28h in the unload position where the fuel filter housing 32 is being removed from the mounting fixture after leak testing. The fuel filter housings 32 are removed from the mounting fixture by a movable arm 52 that carriers an electromagnet 54 for attaching the housings 32. The arm 52 is moved into a position near the housing in the mounting fixture at which point the electromagnet is activated, causing the housing to be attracted to the electromagnet. The arm is then retracted to the position shown in solid lines in FIG. 4 and the electromagnet is deactivated, allowing the housing to fall onto the ramp 38. Ramp 38 is constructed cf two discharge chutes 56 and 58. Chute 56 is for non-leaking components while chute 58 is for leaking components. A movable gate 60 is rotated about pivot 62 to direct the unloaded fuel filter housing to either the accept chute 56 or reject chute 58. The apparatus control system automatically moves the gate 60 depending on the results of the leak test conducted when the component was in the test position.

Figure 6:
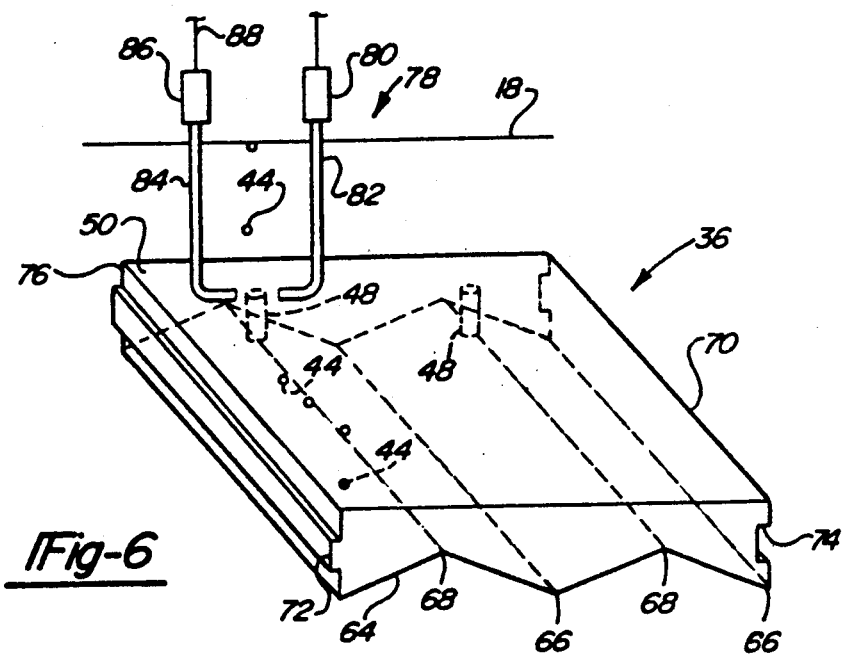
FIG. 6 is a perspective view of the bubble deflecting panel and the fiber optic bubble detector.

With reference to FIG. 6, the panel 36 is shown in greater detail. The panel 36 has a lower surface 64 which is corrugated having alternating ridges 66 and grooves 68. Ridges 66 are spaced approximately two to three inches from each other depending of the size of the component being tested. The panel 36 is inclined in the water at approximately 20° to 30° from the horizontal. The angle of the panel 36 must be large enough to allow bubbles to rise freely in the grooves 68 without sticking to the panel.

The bottom surface of the panel 36 must have a proper surface finish to prevent bubbles from sticking to the panel. The surface must permit "wetting" or the formation of a film of water on the panel surface when the panel is out of the water. A surface that will not "wet" will form droplets of water on its surface as opposed to a water film. A smooth acrylic panel will not wet. When air bubbles contact a smooth panel, the bubble will displace all water between the bubble and the smooth surface such that the surface tension of the bubble will hold the bubble to the panel and prevent it from rising upward. To ensure "wetting" of the panel 36, the bottom surface is painted with a latex paint. Other surface treatments can be used such as sanding with an 80 grit sand paper or fine sandblasting with 220 to 240 grid sand at 100 psi. The resulting surface is similar to a frosted glass. However, if the surface is too rough, bubble movement can also be impeded.

Shown in FIG. 6 is one panel module 70 which includes two grooves 68. The panel 36 is constructed by attaching two or more modules 70 together along the tongue 72 and groove 74 on opposite sides of the module 70 to construct a panel 36 of a size to cover the entire component being tested. Near the upper end 76 of each module, an aperture 48 extends upward through the module from the lower surface 64 to the upper surface 50 at the apex of each groove 68. A bubble from a leaking component will rise from the component in the test station and contact the lower surface 64 of the panel 36. The bubble will then rise to the apex of a groove 68 and continue to rise along the apex until the bubble reaches an aperture 48. The bubble will rise vertically through the aperture 48 and continue upward to the surface of the water 18 in the holding tank. The fiber optic detector 78 includes a light source 80 positioned above the water that produces light radiation directed through a first fiber optic cable 82 to one side of the aperture 48 at the top surface 50 of the panel. The light is directed across the top of aperture 48 and is received by a second fiber optic cable 84. Cable 84 directs the light to a light detector 86 also positioned above the water level. When a bubble 44 rises through the aperture between the two fiber optic cables 82 and 84, the light radiation received by the light detector is interrupted. The interruption causes an electrical signal to be produced by the detector 86 which is directed through a wire 88 to the control circuit, not shown. A separate fiber optic detector 78 is positioned above each aperture 48 in the panel 36, only one of the fiber optic detectors is shown in FIG. 6.

The system controller can be programmed to discriminate between random air bubbles that may be formed on the outside of the component as it was submerged, referred to as attached bubbles, and bubbles which originate from a leak. For example, assume that it has been determined that five bubbles rising from a component indicate an unacceptable leakage and unacceptable leak. If a leak is indicated once a total of five bubbles have counted from all of the fiber optic bubble detectors, the leak could have been indicated by five attached bubble arising from random locations on the component part or the test mounting fixture. Leak bubbles, on the other hand, are formed at a given location on the component surface. The bubbles rising from a leak will be detected by a single fiber optic detector or by two or three adjacent detectors. Small currents in the water may cause bubbles originating from the same leak to be directed to adjacent grooves and sensed by different fiber optic detectors. The system controller can be programmed to add the number of bubbles detected from a set of two or more adjacent grooves 68. When the total bubble count for a set exceeds a predetermined number, for example five, a leak would then be indicated and the part rejected.

An example is shown in table 1 of how these sets can be arranged and a possible scenario for the bubbles counted in each set. In this example, the deflector panel 36 has ten grooves 68. Eight sets of three adjacent fiber optic detectors are formed. Set one is comprised of detectors 1, 2, and 3, set two is comprised of detectors 2, 3 and 4, etc. The sets are overlapping in that, except for the detectors at the edge of the panel, each detector is in three separate sets.

TABLE 1

| SET | GROOVES | BUBBLE COUNT |
| --- | --- | --- |
| 1 | 1, 2, 3 | 1 |
| 2 | 2, 3, 4 | 3 |
| 3 | 3, 4, 5 | 5 Reject |
| 4 | 4, 5, 6 | 4 |
| 5 | 5, 6, 7 | 3 |
| 6 | 6, 7, 8 | 1 |
| 7 | 7, 8, 9 | 1 |
| 8 | 8, 9, 10 | 1 |

In this example, the number of bubbles counted by the detectors in set three has reached the predetermined number of five, whereby a leak is indicated. In this manner, the apparatus can discriminate between the five bubbles originating from random locations on the component surface and five bubbles that originate from approximately the same location. Because bubble are rising form the same source may not be detected by the same fiber optic detector, it is necessary to combine the bubbles counted from adjacent grooves in the panel 36. The system controller can also be used to record the location of leaks in several components tested over a period of time to determine deficiencies in the manufacture and process of the component.

Referring again to FIG. 3, a water pipe 90 having one or more outlets 92 is shown with the outlets 92 positioned below the deflector panel 36. Prior to the initiation to a test cycle, water is pumped through the pipe 90 and outlets 92 to sweep away bubbles from the deflector panel 36 which have been formed as the component was submerged or moved into position beneath the deflector panel 36. In this way, it is assured that the bubbles counted during the test will be from component leaks versus attached bubbles formed when the component was submerged. Additional details of the bubble detection system are shown in U.S. Pat. No. 4,854,158, and application Ser. No. 07/338,622, filed Apr. 17, 1989, both commonly assigned and incorporated herein by reference.

With reference to FIG. 5, the support and drive for wheel 22 is shown. Wheel 22 is supported by frame 98 having an extension 100. The frame and extension provide two support bearings 102 for the wheel drive shaft 104.

The wheel drive includes a motor 106, a speed reducer 108 and clutch assembly 110 coupled by drive belts 112 and 114. The motor is operated continuously while the clutch assembly is intermittently actuated by the apparatus control to provide indexed rotation of shaft 104 and wheel 22. This rotates the fixtures 28 on the wheel to the load, test and unload stations, stopping at each station for sufficient time to conduct the leak test on the component positioned under the bubble deflection panel 36.

The leak detector described above thus fully automates water immersion leak testing. With automatic detection of leak air bubbles, the primary disadvantage of immersion testing, operator dependence, is eliminated. The addition of automatic component loading and unloading to automatic leak detection results in complete automation of the leak testing process.

It is to be understood that the invention is not limited to the exact construction described above, but that various changes and modifications may be made without departing from the spirit and scope of the invention as defined in the following claims.

What is claimed is:

1. An automated apparatus for leak testing at least one fluid containing chamber by detecting bubbles of gas rising from said chamber when said chamber is submerged in a liquid, comprising:
   a deflector disposed in said liquid for guiding said bubbles toward a predetermined location;
   means adjacent said predetermined location for detecting said bubbles passing said predetermined location and producing a signal in response thereto;
   means for registering the number of said signals; and
   a turntable for rotating said chamber to a submerged position below said deflector to enable bubbles from said chamber to rise to said deflector.

2. The apparatus of claim 1 further comprising means associated with said turntable for sealing said chamber from the atmosphere.

3. The apparatus of claim 2 further comprising means for pressurizing said chamber with said gas.

4. The apparatus of claim 2 further comprising means for automatically actuating said seal means to seal and unseal said chamber to enable loading and unloading of said chamber from said turntable.

5. The apparatus of claim 1 wherein said apparatus further comprises a tank for holding a quantity of said liquid and said turntable is rotatable about a generally horizontal axis and has a plurality of mounting fixtures affixed to said turntable circumferentially equally spaced adjacent the periphery of said turntable; and
   said turntable disposed relative to said tank so as to submerge a portion of said turntable and at least one of said mounting fixtures in said liquid.

6. The apparatus of claim 5 wherein rotation of said turntable is indexed to rotate a predetermined angular distance and stop at a position in which: one of said plurality of mounting fixtures is disposed beneath said deflecting means, one of said mounting fixtures is in a position to unload a test chamber, and one of said mounting fixtures is in a position to receive a chamber to be tested.

7. The apparatus of claim 1 wherein said detection means includes:
   fiber optic means adjacent said predetermined location for transmitting light radiation across said predetermined location and for receiving at least a portion of said light radiation after crossing said predetermined location; and
   means operatively associated with said fiber optic means for producing an electrical signal in response to an interruption of light radiation crossing said predetermined location when one of said bubbles pass said predetermined location.

8. The apparatus of claim 1 wherein:
   said deflector comprises a panel having a corrugated surface of alternating parallel ridges and grooves extending in one direction along the bottom of said panel;
   said panel being inclined upwardly in said one direction whereby said rising bubbles travel through said grooves toward the upper end of said panel;
   said panels having generally vertical apertures therethrough extending upward from each of said grooves adjacent the upper end of said panels; and
   said predetermined locations being at the upper end of said apertures.

9. The apparatus of claim 8 further comprising:
   means for producing a flow of water through said grooves to prevent said bubbles from adhering to said panel.

10. The apparatus of claim 1 wherein said deflector permits wetting.

11. The apparatus of claim 10 wherein said deflector comprises a roughed surface sufficient to permit said wetting.

12. The apparatus of claim 10 wherein said deflector is coated with a substance to permit said wetting.

13. The apparatus of claim 1 further comprising a source for said liquid and a pump to create a flow of said liquid through said test chamber.

14. The apparatus of claim 1 wherein said deflector comprises a plurality of elongated panels, and said location comprises an elongated section.

15. The apparatus of claim 14 having a plurality of sections and detecting means configured to determine which of said sections a bubble has passed.

16. An automatic leak detection apparatus for leak testing a fluid containing chamber by detecting bubbles of a gas rising from said chamber when said chamber is pressurized and submerged in a liquid comprising:

a panel disposed in said liquid for deflecting said bubbles to one of a plurality of predetermined locations, said panel having a corrugated surface of alternating parallel ridges and grooves extending in one direction along the bottom surface of said panel, said panel being inclined upwardly in said one direction whereby said rising bubbles travel through said grooves toward the upper end of said panel, said panels having generally vertical apertures therethrough extending upward from each of said grooves adjacent the upper end of said panels, said predetermined locations being at the upper end of said apertures;

means adjacent said plurality of predetermined locations for detecting said bubbles passing said predetermined locations and for producing a signal in response thereto;

means for counting the number of said signals and for indicating a leak when a predetermined number of said signals are counted; and a wheel having at least three chamber mounting fixtures attached thereto, said wheel be generally upright and rotated about a generally horizontal axis, said wheel being disposed with a lower portion of said wheel submerged within said liquid, the rotation of said wheel being indexed so that said wheel rotation stops intermittently with one of said mounting fixtures submerged in said liquid beneath said deflecting panel so that bubbles rising from the chamber in said fixture contact said panel, another of said fixtures is at a chamber unload position where a tested chamber is removed from said fixture and a third fixture is at a load position where a chamber to be tested is positioned on said mounting fixture.

17. The leak detection apparatus of claim 16 wherein said detection means includes:

fiber optic means adjacent said predetermined locations for transmitting light radiation across said predetermined locations and for receiving at least a portion of said light radiation after crossing said predetermined locations; and means operatively associated with said fiber optic means for producing an electrical signal in response to an interruption of light radiation crossing said predetermined locations when one of said bubbles pass one of said predetermined locations.

18. The apparatus of claim 16 further comprising:

means for producing a flow of water through said grooves to prevent said bubbles from adhering to said panel.

19. The apparatus of claim 16 further comprising:

means for adding the number of electrical signals produced by said bubbles passing two or more adjacent predetermined locations; and means for indicating a leak from said chamber when the sum of said electrical signals exceeds a predetermined number.

20. An automated apparatus for leak testing a plurality of fluid containing chambers by detecting bubbles of a gas rising from one of said chambers when in a submerged position in a liquid, comprising:

an elongated panel in said liquid above said submerged position for deflecting said bubbles past at least one predetermined section;

means for introducing said gas into said chambers;

a turntable indexed to rotate a predetermined angular distance and stop at a position in which: one chamber is in said submerged position beneath said deflecting means, another chamber is in a position to be unloaded from said turntable, and another chamber to be tested may be loaded onto said turntable;

a light radiation source for projecting a beam of light along said predetermined section;

means disposed adjacent said predetermined section opposite said light radiation source for receiving said beam of light, said receiving means producing a signal when said beam of light is interrupted by a bubble passing said predetermined section; and means for registering the number of said signals.

21. The apparatus of claim 20 wherein rotation of said turntable is indexed to rotate a predetermined angular distance and stop at a position in which: one chamber is disposed beneath said deflecting means, another chamber is in a position to be unloaded from said turntable, and a chamber to be tested may be loaded onto said turntable.

* * * * *

UNITED STATES PATENT AND TRADEMARK OFFICE
CERTIFICATE OF CORRECTION

PATENT NO. : 5,054,311
DATED : October 8, 1991
INVENTOR(S) : Donald Charles Gates It is certified that error appears in the above-identified patent and that said Letters Patent is hereby corrected as shown below:

```
Column 1, line 16, "leak" should be --Leak--.

Column 3, line 65, "an" should be --a--.

Column 4, line 4, "that" should be --than--.

Column 4, line 66, "paneI" should be --panel--.

Column 5, line 8, "carriers" should be --carries--.

Column 5, line 16, "cf" should be --of--.
```

Signed and Sealed this

Seventeenth Day of August, 1993

Attest:

BRUCE LEHMAN

*Attesting Officer*   *Commissioner of Patents and Trademarks*